Patented Nov. 24, 1936

2,061,616

UNITED STATES PATENT OFFICE 2,061,616

PRODUCTION OF CELLULOSE

Henry Dreyfus, London, England,

No Drawing. Application July 12, 1935, Serial No. 31,098. In Great Britain August 7, 1934

9 Claims. (Cl. 92—13)

This invention relates to the production of cellulose from lignin-containing cellulosic material such as wood, straw, grass, and the like, or chemical wood pulps.

According to the invention the lignin-containing cellulosic material is treated with an alkali solution at a moderate temperature or in the cold, and under a pressure greater than that produced by the solution at the temperature employed.

The alkali solution may with advantage be a sodium hydroxide solution of concentration between about 6% and 20%, and especially between about 7% and 12% or 15%, or a solution of equivalent alkalinity; for example, a sodium hydroxide solution of concentration between 10% and 12% may be used.

The temperature at which the cellulosic materials are treated is preferably in the neighborhood of or below 150° C., and especially between 100° and 130° C., for instance 120° C., although temperatures below 100° C., for instance down to 80° C. or lower, may be employed if desired, especially when relatively high excess pressures are used; the use of cold or relatively cold solutions of alkali, for example solutions of temperature up to about 65° C., under pressures higher than atmospheric, is of particular use when dealing with materials from which most of or substantially all the lignin has already been removed, as for example in chemical pulps. The pressure under which the treatment is carried out may be, for example, 50 lbs., 100 lbs., 200 lbs., or even 500 lbs. per square inch in excess of that produced by the solution at the temperature of the treatment. Such excess pressures may be produced by means of inert gases such as nitrogen under pressure, or by the addition of relatively small quantities of volatile liquids, for example, diethyl ether, or in any other way.

The time during which the treatment is carried on will depend on the concentration of the solution and the temperature and pressure employed as well as on the nature of the materials being treated. In general, however, materials may be subjected to the treatment for a period of between about 6 and 18 hours. The treatment is preferably carried on until a cellulose relatively free from lignin, pentosans and other impurities is produced.

Advantageously the products obtained by the treatment may be bleached with chlorine or a substance capable of giving rise to chlorine such as calcium or sodium hypochlorite, or any other bleaching treatment may be applied.

Before being subjected to the process which is the subject of the invention the cellulosic material may, if desired, be treated with a dilute alkali solution or other agent adapted to remove resins and the like. Preferably any such preliminary dilute alkali treatment is effected at a comparatively low temperature, for example at a temperature below about 45° C., although if other resin removing agents are used, other temperatures may be employed; for example, the wood or other material may be extracted with water, in which case higher temperatures may be employed with advantage. However, even in the absence of a pretreatment of this kind, the alkaline liquors employed in the present process are themselves well adapted to remove resins and the like from the materials during the process.

Any convenient means may be employed to effect a thorough penetration of the wood or other cellulosic material by the alkaline liquor. Thus the material may be employed in a finely divided form; for instance, wood may be treated in the form of chips or the like. If desired, moreover, the vessel containing the material may be evacuated to any desired extent before the liquor is admitted thereto, the contents of the vessel may be subjected to agitation, e. g. by employing a rotating vessel, or any other device for ensuring or promoting a thorough impregnation may be employed.

A special advantage of the process of the invention is that it makes possible the production in a single stage or other simple process of cellulose which is substantially free, not only from lignin, but also from pentosans, resins and other impurities. At the same time the cellulose produced has a very favorable α-cellulose content and is thus especially suitable as a starting material in the manufacture of organic derivatives of cellulose such as cellulose acetate or other cellulose esters or cellulose ethers.

Before being subjected to a subsequent esterification process the cellulose may advantageously be treated with, for example, acetic, formic and/or other lower aliphatic acids, as described in French specification No. 565,654, dated 30th April 1923, or with vapours of such acids as in U. S. Patent No. 1,831,101. Any desired form of pretreatment and any convenient esterification process may be employed and the cellulose ester produced may be spun into filaments, cast as films or otherwise employed in any suitable manner. Moreover, the cellulose produced according to the invention may be used for the manufacture of other products such as high grade cellulose ethers, viscose, etc. Pretreatment with acids is not in general necessary when manufacturing such derivatives.

Any other desired treatment may follow the treatment according to the invention; for example the cellulose may be treated with alkali, for example of concentration up to 20% in the cold, or with sulphur dioxide or in any other way. In general, however, such extra treatments will not be found to be necessary.

The following examples illustrate without in any way limiting the invention:—

Example 1

Spruce chips are treated in a digester with dilute alkali at a temperature of 35° C. to remove resins, and are then subjected to a cook with 10% sodium hydroxide at 120° C. under a pressure of about 220 lbs. per square inch, produced by forcing nitrogen into the digester. After about 12 or 15 hours the alkaline liquor is run off, and the solid product is thoroughly washed and subjected to a bleach with sodium hypochlorite or bleaching powder.

Example 2

Wood chips are treated for about 15 hours with 13% sodium hydroxide solution at a temperature of 125° C. and under a pressure of 300 lbs. per square inch. The product may be subjected to a chlorine bleach if desired.

Example 3

A sulphite pulp is treated with 10% sodium hydroxide solution at a temperature between 50° and 60° C. under a pressure of 400 lbs. per square inch for several hours. The alkali solution is then drained off and the product bleached.

What I claim and desire to secure by Letters Patent is:—

1. Process for the manufacture of cellulose from lignin-containing cellulosic materials, which comprises treating the materials at a temperature of at most 150° C. with a 6 to 20% caustic alkali solution under a pressure higher than the vapor pressure of the solution at the temperature employed.

2. Process for the manufacture of cellulose from lignin-containing cellulosic materials, which comprises treating the materials at a temperature of at most 150° C. with a 7 to 15% caustic alkali solution under a pressure higher than the vapor pressure of the solution at the temperature employed.

3. Process for the manufacture of cellulose from lignin-containing cellulosic materials, which comprises treating the materials at a temperature between 100 and 130° C. with a 6 to 20% caustic alkali solution under a pressure higher than the vapor pressure of the solution at the temperature employed.

4. Process for the manufacture of cellulose from lignin-containing cellulose materials, which comprises treating the materials at a temperature between 100 and 130° C. with a 7 to 15% caustic alkali solution under a pressure higher than the vapor pressure of the solution at the temperature employed.

5. Process for the manufacture of cellulose from lignin-containing cellulosic materials, which comprises treating the materials at a temperature of at most 150° C. with a 6 to 20% caustic alkali solution under a pressure between 50 and 500 pounds per square inch above the vapor pressure of the solution at the temperature employed.

6. Process for the manufacture of cellulose from lignin-containing cellulosic materials, which comprises treating the materials at a temperature between 100 and 130° C. with a 6 to 20% caustic alkali solution under a pressure between 50 and 500 pounds per square inch above the vapor pressure of the solution at the temperature employed.

7. Process for the manufacture of cellulose from lignin-containing cellulosic materials, which comprises treating the materials at a temperature between 100 and 130° C. with a 7 to 15% caustic alkali solution under a pressure between 50 and 500 pounds per square inch above the vapor pressure of the solution at the temperature employed.

8. Process for the manufacture of cellulose from chemical wood pulps containing residual lignin, which comprises treating the wood pulp at a temperature below 65° C. with a 6 to 20% caustic alkali solution under a pressure higher than atmospheric.

9. Process for the manufacture of cellulose from chemical wood pulps containing residual lignin, which comprises treating the wood pulp at a temperature below 65° C. with a 7 to 15% caustic alkali solution under a pressure of between 50 and 500 pounds per square inch.

HENRY DREYFUS.